United States Patent [19]

Smith et al.

[11] Patent Number: 4,818,586
[45] Date of Patent: Apr. 4, 1989

[54] PREFERENTIALLY NEEDLED TEXTILE PANEL AND METHOD

[75] Inventors: Gerald J. Smith; Elwood G. Trask, both of Auburn, Me.

[73] Assignee: Gates Formed-Fibre Products, Inc., Auburn, Me.

[21] Appl. No.: 120,195

[22] Filed: Nov. 4, 1987

Related U.S. Application Data

[63] Continuation of Ser. No. 820,854, Jan. 21, 1986, abandoned.

[51] Int. Cl.⁴ .............................................. B32B 27/14
[52] U.S. Cl. ..................... 428/198; 28/107; 28/112; 428/91; 428/212; 428/213; 428/218; 428/286; 428/287; 428/288; 428/296; 428/300; 428/913
[58] Field of Search ............... 428/91, 198, 212, 286, 428/287, 288, 296, 300, 913, 213, 218; 28/107, 112

[56] References Cited

U.S. PATENT DOCUMENTS

| | | | |
|---|---|---|---|
| 4,424,250 | 1/1984 | Adams et al. | 428/300 |
| 4,451,314 | 5/1984 | Knoke et al. | 428/300 |
| 4,490,425 | 12/1984 | Knoke et al. | 428/300 |
| 4,568,581 | 2/1986 | Peoples | 428/35 |

Primary Examiner—Marion C. McCamish
Attorney, Agent, or Firm—C. H. Castleman, Jr.; H. W. Oberg, Jr.

[57] ABSTRACT

A nonwoven textile fiber panel, useful, for instance, in manufacturing car truck liners, in which synthetic thermoplastic fibers that vary in fiber length, diameter, denier, and/or density are needle-punched to produce a carpeting material, which can then be directly utilized, or thermoformed to retain a desired shape. The fibers that one desires to show up on the face side of the final product are preferentially driven by the needle barbs of a needle loom through the precursor batt material. This preferential needling can also be enhanced through selection of various needle lengths, needle diameters, and barb spacing configurations.

36 Claims, 4 Drawing Sheets

PREFERENTIALLY NEEDLED TEXTILE PANEL AND METHOD

This is a continuation of application Ser. No. 820,854, filed Jan. 21, 1986 now abandoned.

BACKGROUND OF THE INVENTION

The invention herein pertains to a nonwoven textile and a method of making it, and more particularly pertains to a nonwoven textile panel having a face side, which is predominently one type of fiber, and which is capable of being formed under conditions of heat and pressure to retain a desired shape, one major application of which is carpeting.

Many situations arise where it would be desirable to cover an irregular surface with a carpeting material. A common example of this is to cover the trunk of a car with a carpeting material. In order to work well, such a carpeting material must be capable of taking on irregular, uneven shapes. It must have good hand feel, it must look good, and it must be resistant to the effects of water and soil.

The earliest attempts at meeting these needs involved taking ordinary carpeting, much like what is found on the floors of an average home, and attempting to cut the carpet so as to fit the irregular and uneven lining of a car's trunk. The carpeting would have to be glued down or tied down by means of mechanical fasteners. This had several disadvantages. Firstly, it is expensive and time consuming to individually cut and shape the carpeting to fit the desired area. With time, the adhesive or the fasteners would come loose, and the carpeting would separate from the trunk liner, and curl up at its edges and corners in an unsightly way. Furthermore, the carpeting often was not particularly resistant to the effect of water and heavy soil and would take on an unpleasant soiled and weathered look.

The introduction of synthetic fibers to the carpeting industry meant that carpeting would become more resistant to weathering, fading, and mildewing. However, the problem of fitting carpeting into irregular spaces still existed. Then, ways were developed of using synthetic fibers, whic hwould partially melt when heated up to a certain temperature, and which would then bond to each other when they were cooled. This meant that a carpet-like material could be made out of nonwoven fibers. Carpet-like material made of nonwoven fibers was easier to shape and contour around irregular and uneven surfaces. Furthermore, while the fibers were still warm, a piece of the material could be molded under conditions of pressure and heat to take on the general outline of the area to be carpeted. (This process is known as thermoforming.) Thus, there now exists a way to mold car trunk carpeting quickly and efficiently.

The problem then arose of how to manufacture such carpeting in an efficient and economical way before the carpeting was cut and molded to a given shape. One common approach was to make a soft bulky assembly of fibers, or batt, and then to attach the batt to carpeting that had been loomed on a conventional carpet loom. The loomed carpet would be attached to the batt by a needle loom. A needle loom works by pushing a needle downwards into a bulk of fibers. The needle has barbs on it, but the barbs face downward instead of upwards. In a reverse-fishhook principle, the barbs that are being pushed in a downward direction tend to catch fibers and pull them downwards so as to thoroughly entangle and intermix the fibers among each other. This results in a batt that has been compressed, and is less likely to fray. The process of running such fibers through the needle loom is commonly known as needle-punching, or simply, needling. This is discussed in more detail in U.S. Pat. No. 4,424,250, (Adams and Middleton) the disclosure of which is incorporated herein by reference.

Taking development one step further, it was discovered that the step of attaching a separately loomed carpet to the batt could be eliminated if the batt where needle-punched in such a way as to give it a fuzzy surface to make it look and feel like loomed carpeting. The problem with this was that the end product would be glossy or shiny after having been molded. Often, there were regions on the surface where fibers had visibly fused together, thus giving the product a less pleasing appearance. Also, the end product would not always be stiff enough to sufficiently cover vertical surfaces. Furthermore, such a carpet could not always be shaped closely enough to follow particularly sharp contours. Thus, there was a need for a way of making a nonwoven fiber carpeting that had desirable carpet-like qualities, good hand-feel, absence of fused, glossy, or shiny surface areas, which could be shaped around particularly sharp contours, and which had enough stiffness to cover vertical surfaces without having to be affixed onto such a surface.

It is therefore an object of the present invention to provide a nonwoven, needle-punched carpeting, (among other classes of textile materials) which will not show glossy, shiny, or fused regions on the surface after the carpeting has been subjected to heat during the molding process. It is another object of the present invention to provide a nonwoven, needle-punched carpeting, which will take on the shape of particularly sharp contours during the molding process, and which will be stiff enough to cover vertical, as well as horizontal surfaces without having to be mechanically fastened to vertical surfaces. It is yet another object of the present invention to produce a nonwoven, needle-punched carpet from a fibrous batt in one manufacturing step, which will be capable of being molded.

It is a feature of the present invention to be able to obtain a nonwoven, needle-punched carpeting (again, among other classes of textile materials) material, which can be formed into a relatively rigid textile panel from a loosely consolidated, nonwoven fibrous batt, which is comprised of different types of fibers that have been chosen so that the needle-punching process will tend to force one type of the fibers to the surface of the final product. It is another feature of the present invention to control the variables of neelde size, needle barb type, needle length, and/or depth of needling during the needle-punching process in order to preferentially push a desired fiber in a loosely consolidated nonwoven fibrous batt towards one side of the carpeting material. It is yet another feature of the present invention that a carpeting material emerges from the needle-punching process without having had to attach a separately loomed carpet to the fibrous backing. It is yet another feature of the present invention that the fibers chosen for the loosely consolidated nonwoven fibrous batt can vary not only as to their likelihood of being preferentially needled to one side of the final product, but also can be chosen so as to vary in their softening point temperatures during the thermoforming process.

Where it is desired to manufacture carpeting or a carpet-like material, it is an advantage of the present invention that the final product exhibits a pleasing, carpet-like appearance, which has good hand-feel. It is another advantage of the present invention that a carpeting material emerges from the needle-punching process without having to separately purchase and attach a separately loomed carpet to the fibrous backing material. For these reasons, and for other reasons that are explained below, the present invention solves a need in this area.

SUMMARY OF THE INVENTION

The present invention overcomes the problems and satisfies the needs previously considered by providing for a nonwoven batt of a first kind of fiber and at least a second kind of fiber. The first kind of fiber will differ from the second kind of fiber, and any additional fibers, in some characteristic quality that has been selected so that the result will be a greater likelihood of the first kind of fibers being snagged by the needle barbs of a needle loom, and from there being selectively driven to one side of the resulting panel. This is accomplished either by varying the kinds of fibers found in the nonwoven batt before it is needle-punched, or it can be accomplished by varying the types of needles found in the neelde loom, or it can be accomplished by a combination of varying either of these factors.

Thus, one type of fiber is driven to one side of the resulting panel, and that side of the panel then has desirable appearance and feel. The resulting panel can be thermoformed to take on a desirable shape, if thermoplastic fibers were included in the fiber mix.

The present invention also provides for a method of making a nonwoven fiber panel by forming a nonwoven batt of a first and at least a second textile fiber, where the fibers have been chosen so that the first fibers are preferentially driven to one side of a resulting panel by the needle barbs of a needle loom, and needling the nonwoven batt in a needle loom. After the first fibers are thus preferentially driven, the resulting textile panel can be thermoformed to take on a desired shape.

By convention herein, the fibers that one desires to have showing on one side of the final product will be referred to as first fibers or alternatively, as high-propensity fibers.

DETAILED DESCRIPTION OF THE DRAWINGS

Figure 1:
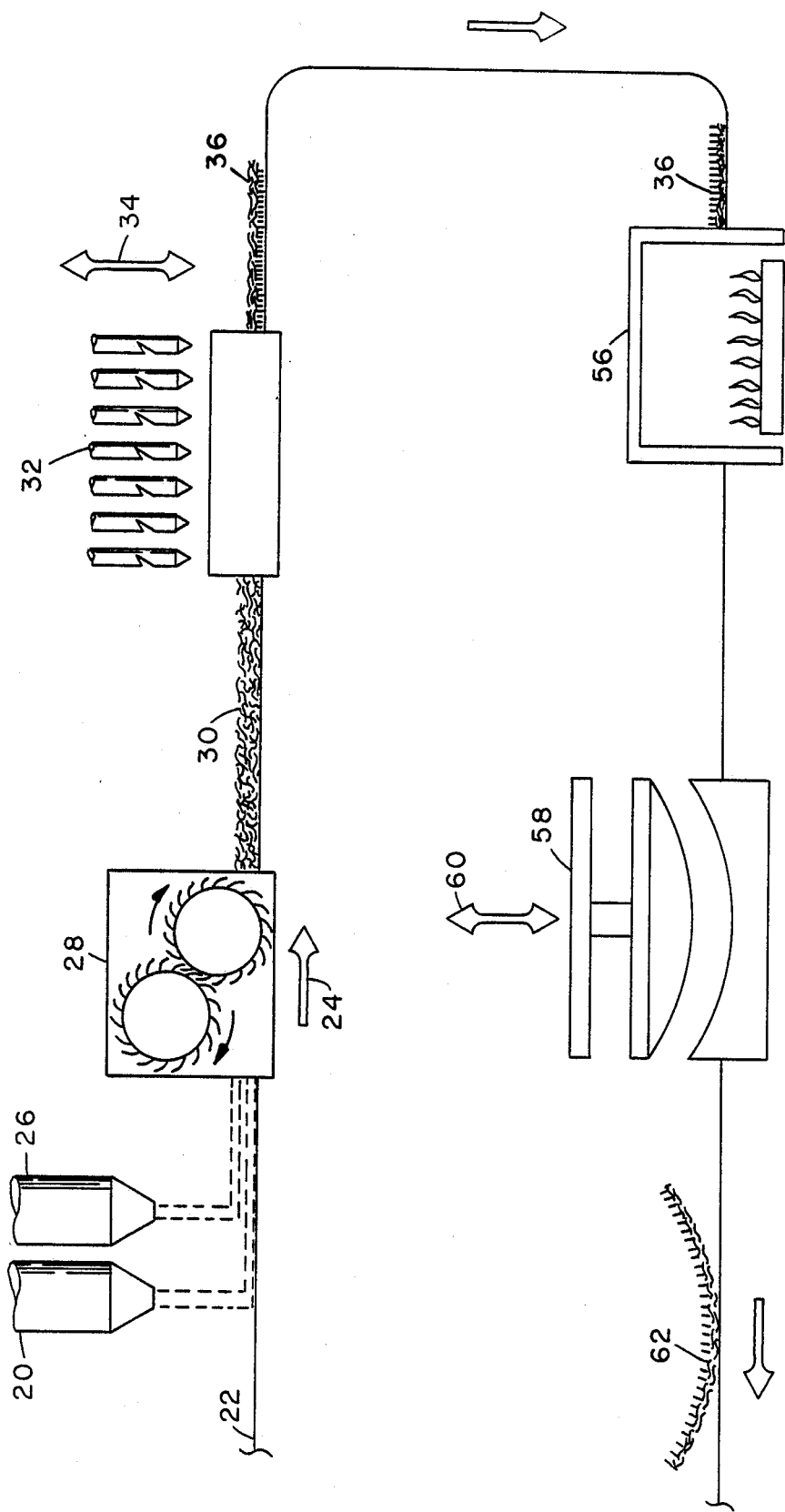
FIG. 1 schematically shows a sequence of manufacturing steps for producing a preferentially needled textile panel.

Turning first to FIG. 1 there is shown, in general schematic format, processing steps for manufacturing the preferentially needled textile panel. At 20 there is shown a first fiber bin, which contains loose, unconsolidated fibers chosen for application in a given version of the panel. The fibers are dropped at a controlled rate onto the transfer means 22, which often is simply a type of conveyor belt. When the particular desired version of the panel requires two types of fibers, the second type is stored in a second fiber bin 26, which likewise will drop loose, unconsolidated fibers at a controlled rate onto the transfer means 22, as well as onto the first fibers that were deposited from the first fiber bin 20. It should be understood that where any greater number of fiber types is desired, that such fibers are similarly stored in fiber bins, which drop their contents at a controlled rate onto a transfer means and onto the other types of fibers with which they are to be combined. The transfer means 22 then carries the loose, unconsolidated fibers generally along direction of work-flow 24 towards a carding means 28. The carding means utilizes some type of mechanical carding operation, which will loosely consolidate the fibers entering into the carding means in a manner well known to those skilled in the art. This results in a loosely consolidated batt 30, which is carried along to the next step in the operation, which is needle-punching.

The loosely consolidated batt 30 is fed into a needle loom means 32 having an array of barbed needles that reciprocate in an up and down motion indicated by 34. Prior to preferential needle punching, which is fully explained below, the batt can be preneedled, which means that the batt goes through an intermediate compaction step. In preneedling, the needle loom needles do not have the necessary barbs to snag and drive fibers relatively great distances, so the soft and bulky batt only gets somewhat compacted.

Figure 2:
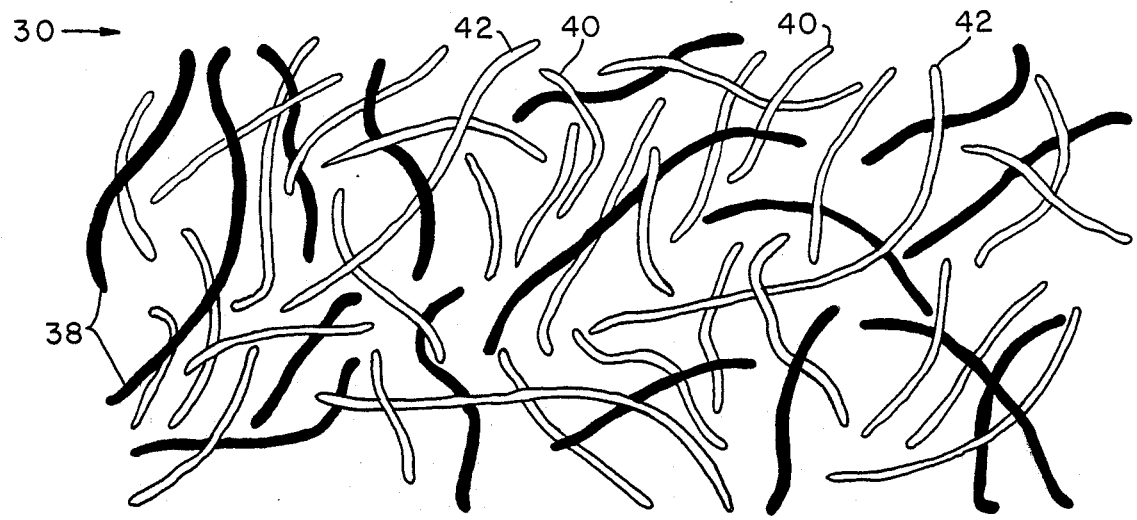
FIG. 2 is a schematic enlarged end view of a precursor, loosely consolidated batt of at least two different kinds of textile fibers.

In order to better explain the action of the needle loom, FIG. 2 is now discussed, which schematically shows a greatly enlarged cross-sectional view of a loosely consolidated batt, shown generally at 30, as it would exist having left a carding means. The loosely consolidated batt 30 will be made up of high propensity fibers 38, lower propensity fibers 40, and where more than two types of fibers are used, a lowest propensity type of fibers 42. The high propensity fibers 38 are so labelled because they have been so chosen, in accordance with the present invention, that they present the greatest statistical likelihood of being snagged by the barbs of the needles of a needle loom, and then being driven or thrown towards one side of the textile material. As can be seen in FIG. 2, the highest propensity fibers and the lower propensity fibers (however many types of low propensity fibers there may be) are found in a totally random state prior to the needle-punching operation.

Figure 3:
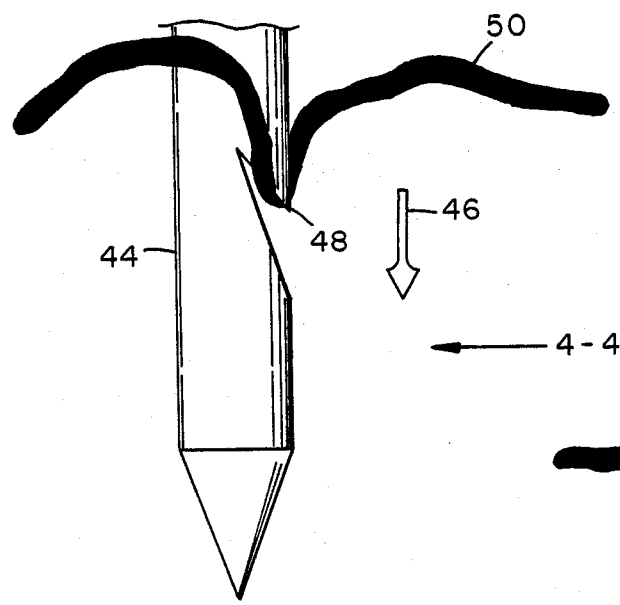
FIG. 3 is a greatly enlarged side view of a barbed needle engaging and downwardly pulling a single textile fiber.
Figure 4:
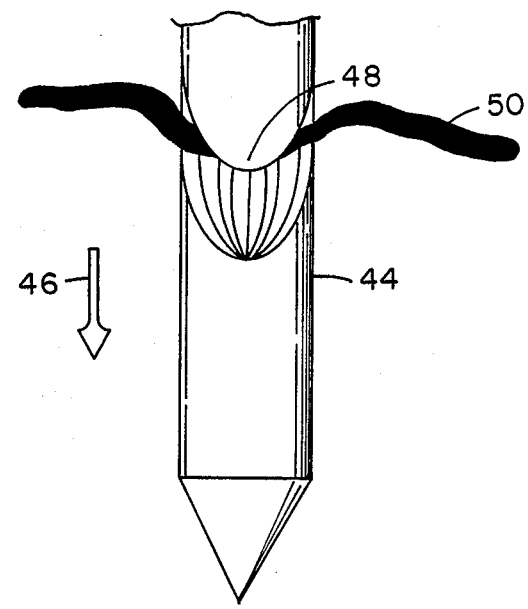
FIG. 4 is a view taken along line 4—4, which gives a frontal view of a barbed needle engaging and downwardly pulling a single textile fiber.

There is shown at FIG. 3 in very enlarged detail, a side view of a needle loom needle 44 traveling in its downward stroke 46, and having caught in its barb 48 a single high propensity fiber 50. FIG. 4, which is taken along line 4—4 of FIG. 3, shows this same action in a front view of the needle. As FIGS. 3 and 4 make clear, the downward stroke of a needle loom needle snags a fiber, thus carrying the fiber downward to the lowest point of the stroke of the needle. As the needle begins its upward stroke, the fiber is released from the barb in an action that is the reverse of using a fishhook, and is therefore left in an area close to where the downward stroke of the needle ends and its upward stroke begins.

Figure 5:
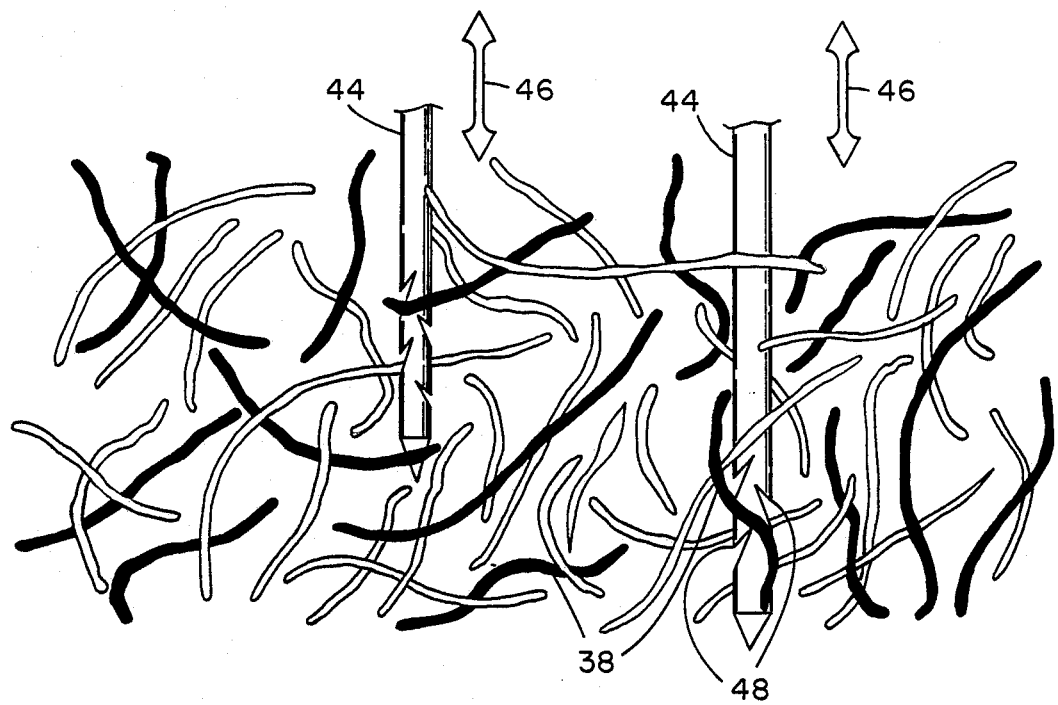
FIG. 5 is a schematic side view showing the action of two needles of a reciprocating needle loom as the needles course up and down through a loosely consolidated batt of fibers.

At FIG. 5, there is shown a close-up schematic view of a cross-section of a batt with the actions of two needle loom needles coursing through the batt. As the needle 44 is going through its downward stroke, it captures a high propensity fiber (as was shown in FIGS. 3 and 4) and drives or throws that fiber towards the bottom side of the panel. The needle then travels upwards until it reaches the top of the upward stroke where it will begin a new cycle downwards.

Figure 6:
FIG. 6 is a schematic side view of a batt of fibers that have been partially needled and where the different types of fibers have been at least partially separated.
Figure 7:
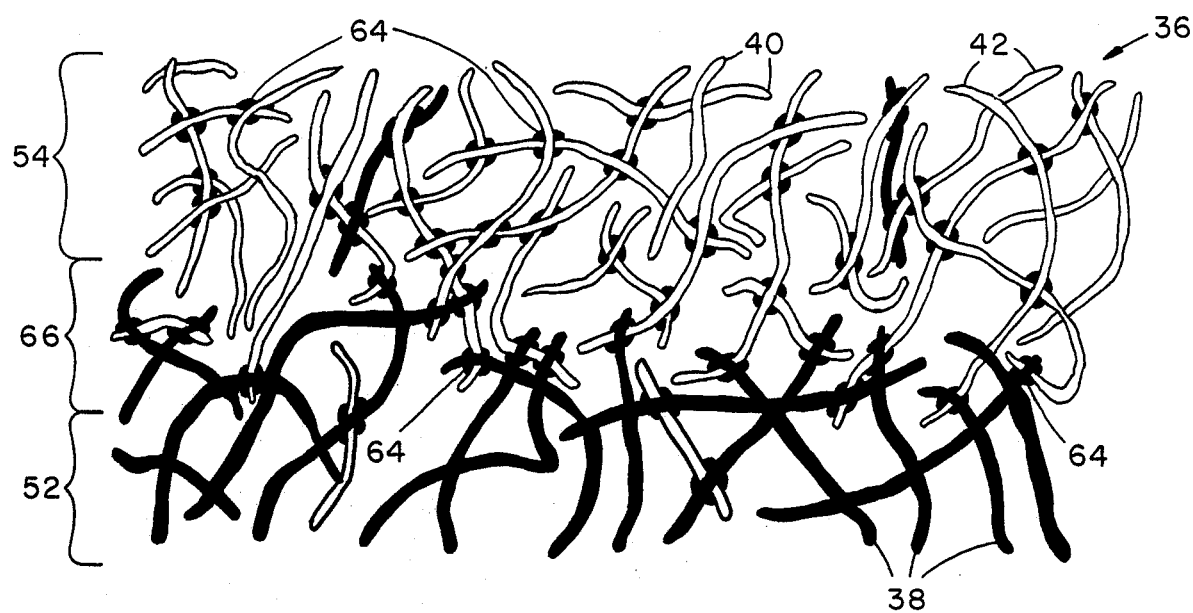
FIG. 7 is a schematic side view of a batt that has been fully needled, and where the fibers have reached the desired stage of a separation, and where the fibers have also subsequently been at least partially fused in a thermoforming process.

In the meantime however, the fibrous mass has been moved horizontally a small distance so that in its next downward stroke, the needle is punching through the fibrous mass at a slightly different position. As the fibers are fed through the needle loom in this manner, the fiber types slowly begin to separate into distinct zones (or layers), which will have higher percentages of either the higher propensity or the lower propensity fibers. At FIG. 6, there is shown a given portion of the fibrous mass where needling has at least partially begun to separate the fiber types. It can be seen that at the uppermost portion of the fibrous mass, there are virtually no high propensity fibers left. At FIG. 7, there is shown the fibrous mass 36, which is now a fully needle-punched batt, and which has distinct zones of virtual homogenous fiber types. (By the term "virtual homogenous" it is meant that a very high percentage of a given fiber type is predominant.) At 52, there is a virtual homogeneous zone almost exclusively of high propensity fibers. At 54, there is a virtual homogeneous zone of the lower propensity fibers. If more than one type of lower propensity fibers had been used in a given mixture of fibers, then those fibers likewise would have been separated into distinct homogeneous zones by the needle-punching operation just described.

Returning now to FIG. 1, the needled batt 36, which now has taken on the appearance of carpeting, continues on in direction of workflow 24. In one preferred embodiment of the invention, the needle-punched carpet will now be subjected to elevated temperature in an oven or furnace means 56. This will be done so that, where it is desired to include synthetic thermoplastic fibers in the fiber mix, those fibers can be heated to their temperature softening point so that they will at least partially soften and will then fuse to each other and to other adjacent fiber types upon subsequently being cooled. Returning to FIG. 7, there is shown at 64 multiple fusing contact points, at which synthetic thermoplastic fibers that have been heated to their temperature softening point have subsequently cooled, and in doing so have fused among themselves and to other adjacent fiber types. In the embodiment shown in FIG. 7, the lower propensity fibers 40, 42 were chosen so as to have a temperature softening point below that of the higher propensity fibers 38. Upon being subsequently recooled, the lower propensity fibers depicted in FIG. 7 fuse among themselves and fuse to the higher propensity fibers in region 66, thus anchoring the higher propensity fibers to the rest of the fibrous batt. Region 54 primarily contains areas of fushion contact points 64 between lower propensity fibers themselves. It should be noted that in the region 52 of the higher propensity fibers, there is a very little, if any, fusing between the higher propensity fibers themselves. Thus, in this particular embodiment of the invention, there is formed a fibrous panel that will have one type of fiber on its face, which fiber type will be anchored at fusion contact points with a second type of fiber, which along with any additional fiber types present will make up the rest of the panel. Furthermore, the second type of fiber will be fused in and amongst itself, and with any additional fiber types present, and will therefore provide a strong, somewhat rigid backing.

In another embodiment of this invention, the heated needled carpet material, as it leaves the oven or furnace means 56, can be inserted into a molding means 58. One can then give the carpeting a contour of desired shape (including complex shapes) under heat and pressure, as the molding means moves through downward and upward strokes 60, in order to provide a final contoured carpet product 62.

In its most preferred embodiment, the preferentially needled textile panel comprises a nonwoven batt of a first and at least a second fiber, the first fiber different from the second fiber, and any additional fibers, in a characteristic quality that is selected so as to result in a greater likelihood of the first fibers being snagged by the needle barbs of a needle loom, and thence being selectively driven to one side of the panel. Preferably, the needling is one-sided needling in a needle loom. Although the fibers are selected partially on the criteria of how likely they are to be snagged by the needle barbs of a needle loom, they can also be selected according to their ability to be softened and rehardened in a thermoforming operation. Therefore, the first fibers selected for the panel may be fibers of a synthetic thermoplastic resin. The first fibers as such may be selected from the group consisting of a polyethylene, polypropylene, polyester, polyamide, polyphenylene sulfide, and a polychlal.

Where the ability to soften and reharden is not an especially important criteria for the first fibers, or any other fibers, they can also be natural fibers or thermosetting resin or any other nonthermoplastic fibers. In this instance, such fibers are instead chosen for their propensity to be driven to one side of a textile panel by a needle loom, as compared to other fibers present.

Furthermore, the second fibers may be fibers of a synthetic thermoplastic resin. The second fibers may be selected from the group consisting of a polyethylene, polypropylene, polyester, polyamide, polyphenylene sulfide, and a polychlal. If there are any fibers in addition to these second fibers, the second and any such additional fibers may be fibers of a synthetic thermoplastic resin, taken from the groups just recited above. Or, those fibers alone (which are fibers additional to the second fibers) may be the fibers of a synthetic thermoplastic resin.

The difference in softening points of fibers chosen for a given version of the preferentially needled textile panel may be such that the first fibers differ from the second fibers in that when the second fibers are heated to a predetermined desired termperature, the second fibers will soften and upon their subsequently being cooled, they will at least partially fuse to each other, and in so doing, will at least partially anchor the first fibers. Or, fibers may be chosen so that if there are any fibers additional to the second fibers, it is those additional fibers that, when heated to a predetermined desired temperature, at least one of such additional fibers will soften and upon their subsequently being cooled, will at least partially fuse to each other and in so doing will at least partially anchor the other fibers, including the first fibers. Finally, the fibers may be so chosen such that when the first fibers are heated to a predetermine desired temperature, the first fibers will soften, and upon their subsequently being cooled, will at least partially fuse to each other, and in so doing, will at least partially anchor the second fibers and any additional fibers.

Choosing fibers with regard to their likelihood of being snagged by the needled barbs of a needle loom, and therefore selectively driven to one side of the panel, involves several different parameters. From the following discussion, it should be understood that these parameters do not necessarily depend on chemical differences. Firstly, fibers may be chosen with regard to their average fiber length. In general, shorter average length fibers are more likely to be snagged and driven to one side of the panel by the needle loom than are longer average length fibers. By convention, the fibers which one most desires to have showing on one side of the final product will be the first fibers. Therefore, fibers can be chosen so that the first fibers differ from the second fibers or any additional fibers in that the average length of the second or any additional fibers is longer than the average length of the first fibers. Furthermore, the second fibers can be chosen so that they differ from any fibers additional to the second fibers in that the average length of the additional fibers is greater than the average length of the second fibers. Logically, any number of those fibers that are additional to the second fibers can be chosen according to having successively greater average fiber lengths. Therefore upon needling, the first fibers, having the shortest average fiber length, would be preferentially driven to one side of the finished product, while the second fibers would be oriented behind them and any additional fibers chosen would be successively oriented behind the second fibers, according to average fiber length. The longest average length fibers would logically be furthest away from the first fibers.

The same selection process can be performed with other parameters which control likelihood of being snagged and driven by the needles of the needle loom. Thus, first fibers can be chosen as to differ from second fibers in that the first fibers are of a lower average denier than the second and any additional fibers, since those fibers having a lower average denier have a higher likelihood of being snagged and being driven to one side of the finished product. The second fibers likewise can be chosen so that they differ from any fibers additional to the second fibers, in that the average denier of the additional fibers is higher than the average denier of the second fibers. Logically, any number of additional fibers can be chosen which have successively higher deniers.

Another parameter is average fiber diameter. First fibers can be chosen so as to differ from second fibers in that the first fibers are of a smaller average diameter than second and any additional fibers. Second fibers can be chosen to differ from any additional fibers so that the average diameter of any additional fibers is larger than the average diameter of the second fibers. Again, any number of fibers can be chosen additional to the second fibers, which have successively larger diameters.

Yet another parameter that can be varied is average fiber density. First fibers can be chosen to differentiate from second fibers in that the first fibers are of a greater average density than the second fibers. Second fibers can be chosen to differentiate from any additional fibers in that the average density of the additional fibers is lesser than the average density of the second fibers. Any number of fibers additional to the second fibers can be chosen, having successively lower average densities.

The above-described fiber parameters can be chosen in combination to achieve the desired mix of high propensity and lower propensity fibers.

In addition to varying parameters affecting fiber types, parameters can be varied with regard to the needles and the needle loom in order to achieve preferential needling.

The gauge of the needles used in the needle loom can also be varied. Needle gauges up to and including the gauge of 38, which is the gauge used in the most preferred embodiment of the panel, can be used. However, gauges greater than 38 could also be used. Those skilled in the art known that the barbs on needle loom needles can be selected as to the spacing of the barbs. The most preferred embodiment of this invention makes use of a close-barbed spaced needle. The depth of needling can also be varied. Needling can be performed up to a depth in the range of 0.49 inches to 0.89 inches, which is a preferred range, or a depth greater than this range. Or, needling can be performed up to a depth of 0.69 inches, which is the most preferred depth.

In order to obtain intermediate effects, the types of needles embedded in the needle carrier of the needle loom can be varied. Thus, the needles need not all be of the same gauge. Different gauges of needles could be mounted in the needle carrier of the loom in order to achieve varying desired densities or fiber distributions within the final product. Furthermore, needles of the needle loom could be varied as to needle barb spacing, or as to the length of the needles mounted in the carrier. Any or all three parameters of needle gauge, barb spacing, and length could simultaneously be varied within the areas of needles mounted within the needle carrier of the needle loom. Finally, needle parameters can be varied along with varying fiber parameters in order to achieve a desired final fiber distribution.

In addition to providing for a new type of panel, the present invention also provides for a new method of making such a panel. This method essentially uses the steps of forming a nonwoven batt of a first and at least a second textile fiber, with those fibers having been chosen so that the first fiber will preferentially be driven to one side of the panel by the needle barbs of the needle loom. This batt is then fed into a needle loom, and the fibers are preferentially driven to one side of the panel, due to the factors relating to fiber type and needle type as discussed above. This method results in a novel nonwoven fiber panel.

The invention further comprises another embodiment, which provides for a method of making a rigid nonwoven fiber panel. This again involves forming a nonwoven batt of a first land at least a second textile fiber, the fibers being chosen so that the first fibers are preferentially driven to one side of the panel by the needle barbs of a needle loom. However, the fibers have also been chosen so that at least one of the fibers, other than the first fibers, is capable of being softened upon being heated to a predetermined desired temperature, and of then at least partially fusing to each other when the fibers are subsequently cooled. The fibers will also then at least partially anchor the first fibers. Having so chosen the fibers, the batt is needled in the needle loom and the first fibers are preferentially driven to one side of the resulting panel. The resulting panel is then heated in some type of furnace or oven means so that the lower melting point fibers will soften. The panel is then allowed to cool somewhat whereupon the partially softened fibers fuse to each other and also fuse to the higher temperature fibers, thereby anchoring them.

If it is desired, in yet another embodiment of the invention, the heated panel can be subjected to a thermoforming operation so as to take on a desired contour or configuration by being molded under pressure and/or heat in a thermoforming means according to methods well known by those skilled in the art of thermoforming. This method results in a unique rigid nonwoven fiber panel product. Or, the heated panel may simply be compressed to obtain a substantially flattened product, which can be cut to desired dimensions for later optional thermoforming.

The amount of heating can be controlled so as to control the amount of fibers that are melted and will subsequently fuse, thereby dictating the relative rigidity of the final product.

Figure 8:
FIG. 8 is a schematic side view of an alternative embodiment of the invention, in which a foam backing is affixed onto a needled and thermoformed batt.

If it is desired, in yet another embodiment of the invention, a layer of foam backing 67 can be adhered or attached to the backside of the carpet panel by methods well known to those skilled in the art. (FIG. 8)

One more parameter which can be controlled in fibertype is that of color. High propensity fiber types can be chosen to have a contrasting color from lower propensity fiber types. The resulting panel would have opposed sides of different colors in this case. Alternatively, colors can be mixed to obtain a heather-like appearance in the final product.

EXAMPLE I

A homogenous blend of fiber was carded into a batt using coarse denier (18-20 denier) polypropylene fiber, 15 denier polyester fiber, and 6 denier polyester fiber. The batt was needled on one side to a depth of approximately 0.69 inches using 38 gauge needles having close-barbed spacing. The resulting carpet panel was then molded using conventional thermoforming techniques.

EXAMPLE II

A homogeneous blend of fibers was carded into a batt consisting of 50% by weight 20 denier polypropylene and 50% by weight 6 denier polyester. The needling was performed, as described in Example I, to produce a carpeting panel.

EXAMPLE III

A homogeneous blend of fibers was carded using 50% by weight of 20 denier polypropylene, 25% 15 denier polyester, and 25% 6 denier polyester. The batt was needle-loomed, as described in Example I, to produce a product having a predominantly polyester face capable of being thermoformed, and having good rigidity and shape definition.

EXAMPLE IV

A nonwoven homogeneous batt is carded, in which a polypropylene portion is made up of both black and white colored fibers and a polyester portion is comprised of both black and white fibers, which have been selected so as to have the same average length, denier, density, and fiber diameter. When this product is needle punched and theremoformed, as described above, a heather grey product is obtained, as opposed to a product having a solid color on the carpet side.

It is thought that the preferentially needled textile panel and method of the present invention and many of its attendant advantages will be understood from the foregoing description, and it will be apparent to those skilled in the art that various changes may be made in the form, construction and arrangement of the parts thereof without departing from the spirit and scope of the invention or sacrificing all of its material advantages. The forms herein described are merely preferred embodiments, and the description herein should not be construed or interpreted as the only embodiments. Although this description has largely discussed application of this invention to the production of carpeting, this is only one major application of the technology, and other applications to the production of other textile or textile-containing products are not intended to be precluded. These may include, but are not limited to, blankets, bedding material, towel material, clothing material, tenting material, composite reinforcement material, sound and/or thermal insulating material, absorbent material, and geotextile material. The following claims should therefore be interpreted as broadly as is reasonable.

What is claimed is:

1. A non woven fiber panel which has been needle-punched, comprising:
   a face side formed predominantly of first fibers which, during needle-punching, have been preferentially snagged from a batt of said first fibers in admixture with other fibers by needle barbs of a needle loom and thence selectively driven to the face side of the panel, said first fibers having an average length which is less than the average length of said other fibers; and
   a base side joined to the face side and formed predominantly of said other fibers.

2. The panel, as claimed in claim 1, which has been needle-punched by one-sided needling.

3. The panel, as claimed in claim 1, in which at least a portion of said other fibers have softened and rehardened so as to fuse to one another and to the first fibers, at least partially anchoring the first fibers, said first fibers not having softened or fused.

4. The panel, as claimed in claim 3, in which needle-punching takes place prior to softening, rehardening and fusing of the other fibers.

5. The panel, as claimed in claim 1, in which the first fibers consist of two or more distinct types of fibers having the common characteristic of being preferentially snagged by the needle barbs, compared to the other fibers which are not so preferentially snagged.

6. The panel, as claimed in claim 1, which has been needle-punched with a needle having a gauge of up to 38.

7. The panel, as claimed in claim 6, in which the needles of the needle loom use a close-barbed spacing.

8. The panel, as claimed in claim 7, in which the batt is needle-punched to a depth in the range of 0.49 inches to 0.89 inches.

9. A nonwoven integrated fabric panel which has been needle-punched and thereafter thermoformed by molding into a shape-stabilized rigidified form of desired non-planar shape, comprising:

a face side formed predominantly of first thermoplastic resin textile fibers which, during needle punching, have been preferentially snagged from a batt of said first fibers in admixture with other thermoplastic resin textile fibers having a lower temperature softening point than the first fibers by needle barbs of a needle loom and then selectively driven to the face side of the panel; and a base side, joined to the face side, formed predominantly of such other fibers, at least a portion of which have softened and rehardened so as to fuse to one another and to the first fibers, at least partially anchoring the first fibers, the first fibers not having softened or fused;

said first fibers having a smaller average diameter than the other fibers, facilitating said preferential snagging thereof.

10. The panel, as claimed in claim 9, in which the first fibers are polyester to produce a predominantly polyester faced panel.

11. A nonwoven fiber panel which has been needle-punched, comprising:

a face side predominantly of first fibers which, during needle-punching, have been preferentially snagged from a batt of said first fibers in admixture with other fibers by needle barbs of a needle loom and thence selectively driven to the face side of the panel, said first fibers having a lower average denier than said other fibers; and a base side joined to the face side and formed predominantly of said other fibers.

12. The panel, as claimed in claim 11, which has been needle-punched by one-sided needling.

13. The panel, as claimed in claim 11, in which at least a portion of said other fibers have softened and rehardened so as to fuse to one another and to the first fibers, at least partially anchoring the first fibers, said first fibers not having softened or fused.

14. The panel, as claimed in claim 13, in which needle-punching takes place prior to softening, rehardening and fusing of the other fibers.

15. The panel, as claimed in claim 11, in which the first fibers consist of two or more distinct types of fibers having the common characteristic of being preferentially snagged by the needle barbs, compared to the other fibers which are not so preferentially snagged.

16. The panel, as claimed in claim 11, which has been needle-punched with a needle having a gauge of up to 38.

17. The panel, as claimed in claim 16, in which the needles of the needle loom use a close-barbed spacing.

18. The panel, as claimed in claim 17, in which the batt is needle-punched to a depth in the range of 0.49 inches to 0.89 inches.

19. A nonwoven fiber panel which has been needle-punched, comprising:

a face side formed predominantly of first fibers which, during needle-punching, have been preferentially snagged from a batt of said first fibers in admixture with other fibers by needle barbs of a needle loom and thence selectively driven to the face side of the panel, said first fibers having a smaller average diameter than the other fibers; and a base side joined to the face side and formed predominantly of said other fibers.

20. The panel, as claimed in claim 19, which has been needle-punched by one-sided needling.

21. The panel, as claimed in claim 19, in which at least a portion of said other fibers have softened and rehardened so as to fuse to one another and to the first fibers, at least partially anchoring the first fibers, said first fibers not having softened or fused.

22. The panel, as claimed in claim 21, in which needle-punching takes place prior to softening, rehardening and fusing of the other fibers.

23. The panel, as claimed in claim 19, in which the first fibers consist of two or more distinct types of fibers having the common characteristic of being preferentially snagged by the needle barbs, compared to the other fibers which are not so preferentially snagged.

24. The panel, as claimed in claim 19, which has been needle-punched with a needle having a gauge of up to 38.

25. The panel, as claimed in claim 24, in which the needles of the needle loom use a close-barbed spacing.

26. The panel, as claimed in claim 25, in which the batt is needle-punched to a depth in the range of 0.49 inches to 0.89 inches.

27. A method of making a nonwoven fiber panel having a nonhomogeneous fiber distribution characteristic from a single batt of a mixture of different fibers randomly and homogeneously distributed, comprising the steps of:

forming a nonwoven batt of an admixture of first textile fibers and at least second textile fibers;

selecting at least one needle loom parameter from the group consisting of needle type, needle gauge, needle barb spacing, and depth of needling so that needled barbs of a needle loom preferentially snag said first fibers; and needle-punching the batt in said needle loom to preferentially drive the first fibers to one side of the panel while leaving the second fibers primarily at the other side of the panel.

28. The method of claim 27 wherein the batt is needle punched solely from one side.

29. The method of claim 28 wherein the needles of the needle loom have a gauge up to 38.

30. The method of claim 28 wherein the batt is needle-punched to a depth of 0.49 to 0.89 inches.

31. The method of claim 28 wherein the needles of the needle loom use a close-barbed spacing.

32. A method of making a nonwoven fiber panel having a nonhomogeneous fiber distribution characteristic from a single batt of a mixture of different fibers randomly and homogeneously distributed, comprising the steps of:

forming a nonwoven homogeneous batt of an admixture of first textile fibers and at least second textile fibers;

selecting at least one fiber parameter from the group consisting of average length, average denier, and average diameter so that needled barbs of a needle loom preferentially snag said first fibers; and needle-punching the batt in said needle loom to preferentially drive the first fibers to one side of the panel while leaving the second fibers primarily at the other side of the panel.

33. The method of claim 32 wherein the batt is needle-punched solely from one side.

34. The method of claim 33 wherein the needles of the needle loom have a gauge up to 38.

35. The method of claim 34 wherein the needles of the needle loom use a close-barbed spacing.

36. The method of claim 34 wherein the batt is needle-punched to a depth of 0.49 to 0.89 inches.

* * * * *

UNITED STATES PATENT AND TRADEMARK OFFICE
CERTIFICATE OF CORRECTION

PATENT NO. : 4,818,586

DATED : April 4, 1989

INVENTOR(S) : Gerald J. Smith; Elwood G. Trask

It is certified that error appears in the above-identified patent and that said Letters Patent is hereby corrected as shown below:

Column 11, line 23, after "side", insert -- formed --.

Signed and Sealed this

Sixth Day of February, 1990

Attest:

JEFFREY M. SAMUELS

Attesting Officer     Acting Commissioner of Patents and Trademarks